US010889226B1

(12) United States Patent
Dean et al.

(10) Patent No.: US 10,889,226 B1
(45) Date of Patent: Jan. 12, 2021

(54) VEHICLE PEDAL COVER

(71) Applicant: Ford Global Technologies, LLC, Dearborn, MI (US)

(72) Inventors: William Henry Dean, Plymouth, MI (US); Gregory Pfirman, Westland, MI (US); John Q. White, Canton, MI (US); Pablo Isaac Villalva Sanchez, Mexico City (MX); Steffen Schoenfuss, Odenthal (DE); Richard Alan Kreder, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/600,776

(22) Filed: Oct. 14, 2019

(51) Int. Cl.
*B60N 3/06* (2006.01)
*G05G 1/44* (2008.04)

(52) U.S. Cl.
CPC .............. *B60N 3/063* (2013.01); *G05G 1/44* (2013.01); *G05G 2505/00* (2013.01)

(58) Field of Classification Search
CPC .... B60N 3/063; B60K 26/02; B60K 31/0058; B60T 7/04; B60T 7/06; F16H 19/001; F02D 11/02; G05G 1/44; G05G 1/36; G05G 5/03; G05G 1/60; G05G 1/30
USPC .......................................... 74/612, 608, 512
See application file for complete search history.

(56) References Cited

U.S. PATENT DOCUMENTS

| | | | |
|---|---|---|---|
| 2,235,850 A * | 3/1941 | Rubissow | G05G 1/30 74/513 |
| 2,491,957 A * | 12/1949 | Dilley | F16P 1/02 160/351 |
| 2,983,347 A | 5/1961 | Risk | |
| 4,358,072 A | 11/1982 | Williamson | |
| 5,056,969 A * | 10/1991 | Nerland | B23Q 1/0063 29/DIG. 94 |
| 5,884,532 A | 3/1999 | Rixon et al. | |
| 6,073,515 A * | 6/2000 | Elton | B60N 3/063 296/75 |
| 6,182,525 B1 | 2/2001 | Bowers et al. | |
| 6,782,775 B2 | 8/2004 | Hayashihara | |
| 8,201,655 B1 * | 6/2012 | Haag | B60R 25/005 180/287 |
| 8,662,262 B1 * | 3/2014 | Decker, Jr. | B60T 7/12 188/112 R |
| 8,702,144 B2 | 4/2014 | Kamioka et al. | |
| 9,097,386 B2 * | 8/2015 | Phillips | B23K 9/321 |
| 9,342,092 B2 | 5/2016 | Baur et al. | |
| 9,963,035 B2 | 5/2018 | El Aile et al. | |
| 2006/0060062 A1 * | 3/2006 | Dyk | G10D 13/11 84/422.1 |

(Continued)

FOREIGN PATENT DOCUMENTS

DE 102014013206 A1 3/2016
DE 102015015839 A1 9/2016
(Continued)

*Primary Examiner* — Vinh Luong
(74) *Attorney, Agent, or Firm* — David Coppiellie; Bejin Bieneman PLC

(57) ABSTRACT

An assembly includes a floor, a vehicle pedal disposed above the floor, and a cover. The cover is rotatably connected to the floor. The cover is rotatable relative to the floor from a closed position in which the cover is disposed above the vehicle pedal to an open position in which the vehicle pedal is disposed above the cover.

18 Claims, 5 Drawing Sheets

(56) References Cited

U.S. PATENT DOCUMENTS

| | | | |
|---|---|---|---|
| 2006/0087154 A1* | 4/2006 | Schlafer | B60N 3/063 |
| | | | 296/190.01 |
| 2008/0231090 A1* | 9/2008 | Takeda | B60N 2/06 |
| | | | 297/83 |
| 2011/0068608 A1* | 3/2011 | Ohtsubo | B60N 2/0252 |
| | | | 296/193.07 |
| 2011/0233967 A1* | 9/2011 | Ohtsubo | B60N 2/067 |
| | | | 296/193.07 |
| 2014/0103680 A1* | 4/2014 | Ikeno | B60R 21/04 |
| | | | 296/97.23 |
| 2017/0090504 A1* | 3/2017 | Kadoi | G05G 1/44 |
| 2017/0334313 A1 | 11/2017 | Ahn et al. | |
| 2018/0186266 A1 | 7/2018 | Fitzpatrick et al. | |
| 2019/0310678 A1* | 10/2019 | Wojciechowski | B60T 7/06 |
| 2019/0381881 A1* | 12/2019 | Tayama | G05G 1/30 |
| 2020/0039350 A1* | 2/2020 | Tayama | G05G 5/03 |

FOREIGN PATENT DOCUMENTS

| | | | |
|---|---|---|---|
| GB | 2436608 A | * | 10/2007 |
| JP | 2005119429 A | | 5/2005 |
| JP | 2011243165 A | | 12/2011 |
| JP | 201892336 A | | 6/2018 |
| KR | 101601540 B1 | * | 8/2016 |
| KR | 101694014 B1 | | 1/2017 |
| KR | 1020170137427 A | | 12/2017 |
| WO | 2018151270 A1 | | 8/2018 |
| WO | WO 2019/007840 A1 | * | 1/2019 |

* cited by examiner

VEHICLE PEDAL COVER

BACKGROUND

A vehicle occupant may actuate one or more pedals that actuate components to operate a vehicle. The pedals may actuate a throttle, a brake, or a clutch. The pedals consume space in a vehicle cabin near the occupant's feet. The pedals are positioned for use by the vehicle occupant during operation of the vehicle to accept manual input from the vehicle occupant.

DETAILED DESCRIPTION

Figure 1:
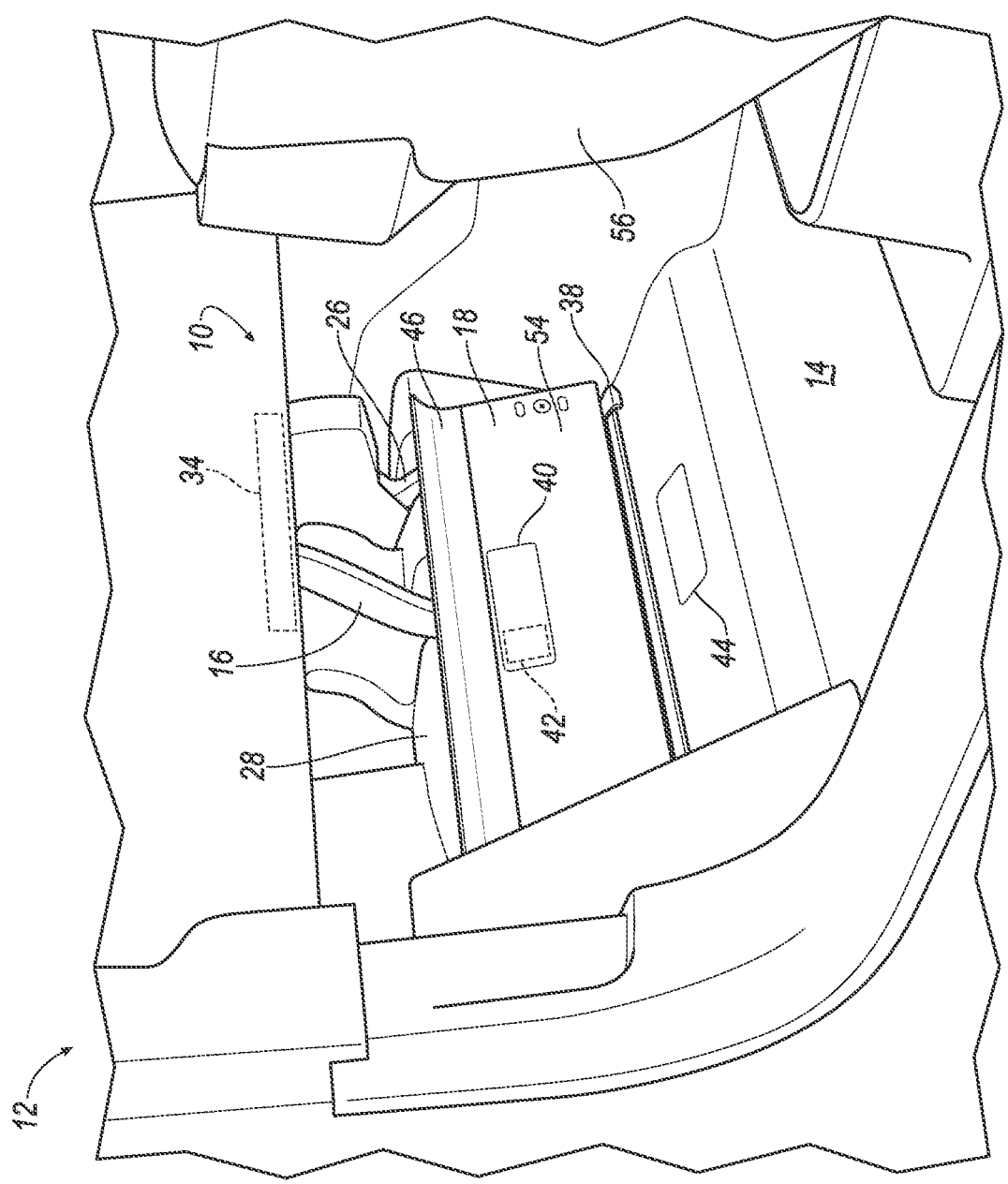
FIG. 1 is a perspective view of a front of a passenger cabin of a vehicle including vehicle pedals in a stowed position and a cover in a closed position.

An assembly includes a floor, a vehicle pedal disposed above the floor, and a cover rotatably connected to the floor and rotatable relative to the floor from a closed position in which the vehicle pedal is behind the cover to an open position in which the vehicle pedal is disposed above the cover.

The assembly may further include a pedal housing, wherein the cover may include a first magnet and the pedal housing may include a second magnet, the first and second magnets magnetically securing the cover to the pedal housing in the closed position.

The pedal housing may define a cavity and the vehicle pedal may be disposed in the cavity when the cover is in the closed position.

The assembly may further include a second vehicle pedal, wherein the pedal housing may define a second cavity and the second vehicle pedal may be disposed in the second cavity when the cover is in the closed position.

The assembly may further include a motor rotatably connected to the vehicle pedal, wherein the motor may be arranged to rotate the vehicle pedal to a deployed position.

When the vehicle pedal is in the deployed position, the cover may be in the open position.

The vehicle pedal may be arranged to move the cover from the closed position to the open position.

The cover may include a first magnet and the floor may include a second magnet, the first and second magnets magnetically securing the cover to the floor in the open position.

The open position may be vehicle-rearward of the closed position.

The cover may include a lip that is substantially flush with the floor when the cover is in the open position.

The assembly may further include a second vehicle pedal, wherein the vehicle pedal and the second vehicle pedal may be behind the cover in the closed position.

The assembly may further include an autonomous driving controller programmed to operate a vehicle in an autonomous mode and to actuate a motor to move the vehicle pedal to move the cover to the open position upon receiving input to leave the autonomous mode.

The autonomous driving controller may be further programmed to actuate the motor to move the vehicle pedal into a pedal housing upon receiving input to operate the vehicle in the autonomous mode.

The cover may be rotatable in a vehicle-rearward direction from the closed position to the open position.

The assembly may further include a hinge between the cover and the floor, wherein the cover may rotate about the hinge from the closed position to the open position.

The vehicle pedal may be one of a brake pedal or an accelerator pedal.

The assembly may further include a seat, wherein the cover may have a front surface facing the vehicle pedal in the closed position in a vehicle-forward direction and a rear surface facing the seat in the closed position in a vehicle-rearward direction.

The cover may be disposed above the vehicle pedal in the closed position.

With reference to the Figures, wherein like numerals indicate like parts throughout the several views, an assembly 10 of a vehicle 12 includes a floor 14, a vehicle pedal 16 disposed above the floor 14, and a cover 18. The 18 cover is rotatably connected to the floor 14. The cover 18 is rotatable relative to the floor 14 from a closed position in which the vehicle pedal 16 is behind the cover 18 to an open position in which the vehicle pedal 16 is disposed above the cover 18.

The cover 18 in the closed position prevents a vehicle occupant from interacting with the vehicle pedal 16 when the vehicle operates in an autonomous mode. When the occupant provides input to transition to a semiautonomous mode or a manual mode, the vehicle pedal 16 moves the cover 18 to an open position, allowing the occupant to provide manual input to the vehicle pedal 16. Covering the vehicle pedal 16 with the cover 18 in the closed position may provide a surface substantially flush with other components, e.g., the floor 14. Rotatably connecting the cover 18 to the floor 14 allow the cover 18 to hide the vehicle pedal 16 in the closed position and to lie substantially flat in the open position to allow unobstructed manual input to the vehicle pedal 16.

Figure 5:
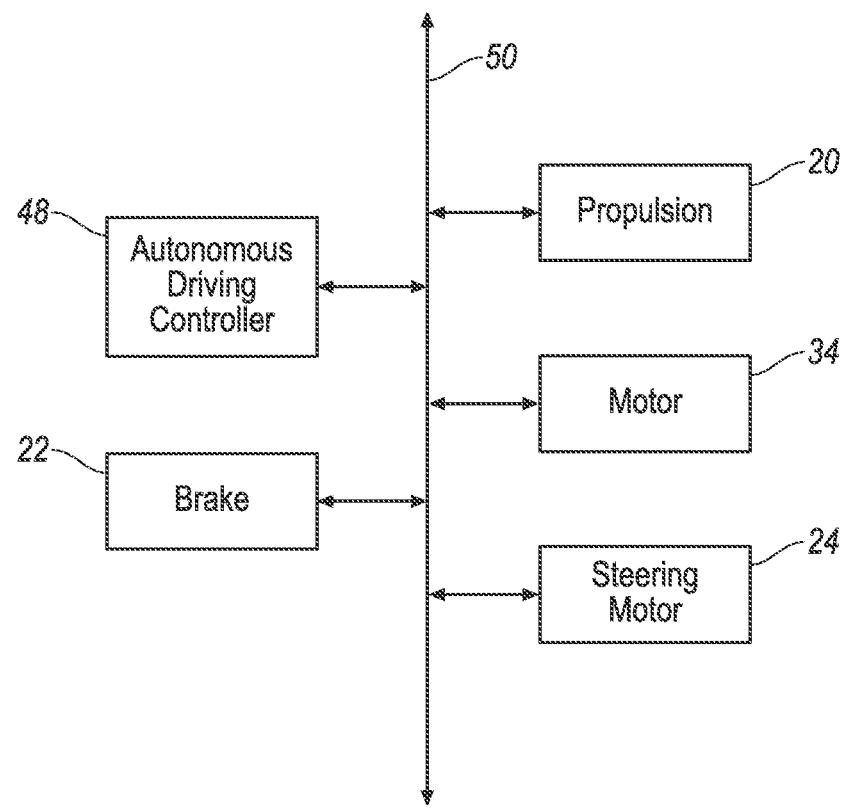
FIG. 5 is a block diagram of an autonomous driving controller communicating with a plurality of vehicle components.

The vehicle 12 may be any suitable type of vehicle, e.g., an automobile, including a sedan, a pick-up truck, a sport-utility vehicle, etc. The vehicle 12 may be an autonomous vehicle. For example, the vehicle 12 may have a computer that controls the operations of the vehicle in an autonomous mode, a semi-autonomous mode, or a non-autonomous mode. For purposes of this disclosure, an autonomous mode is defined as one in which each of vehicle propulsion, braking, and steering are controlled by the computer; in a semi-autonomous mode the computer controls one or two of vehicle's propulsion, braking, and steering; in a non-autonomous mode, a human operator controls the vehicle propulsion, braking, and steering. As shown in FIG. 5, the computer may control a propulsion 20 (e.g., an internal combustion engine, an electric motor, etc.), a brake 22 (e.g., a brake pump that provides brake fluid to a brake pad), and a steering motor 24 (e.g., a steering assist motor that provides torque to a steering rack).

The assembly 10, 10' includes the floor 14, as shown in FIGS. 1-4. The floor 14 supports the vehicle occupant when the vehicle occupant is in a vehicle cabin of the vehicle 12. The floor 14 may thus be exposed to the vehicle cabin. The floor 14 may be, e.g., a fabric layer such as carpet, a polymer layer, etc.

Figure 2:
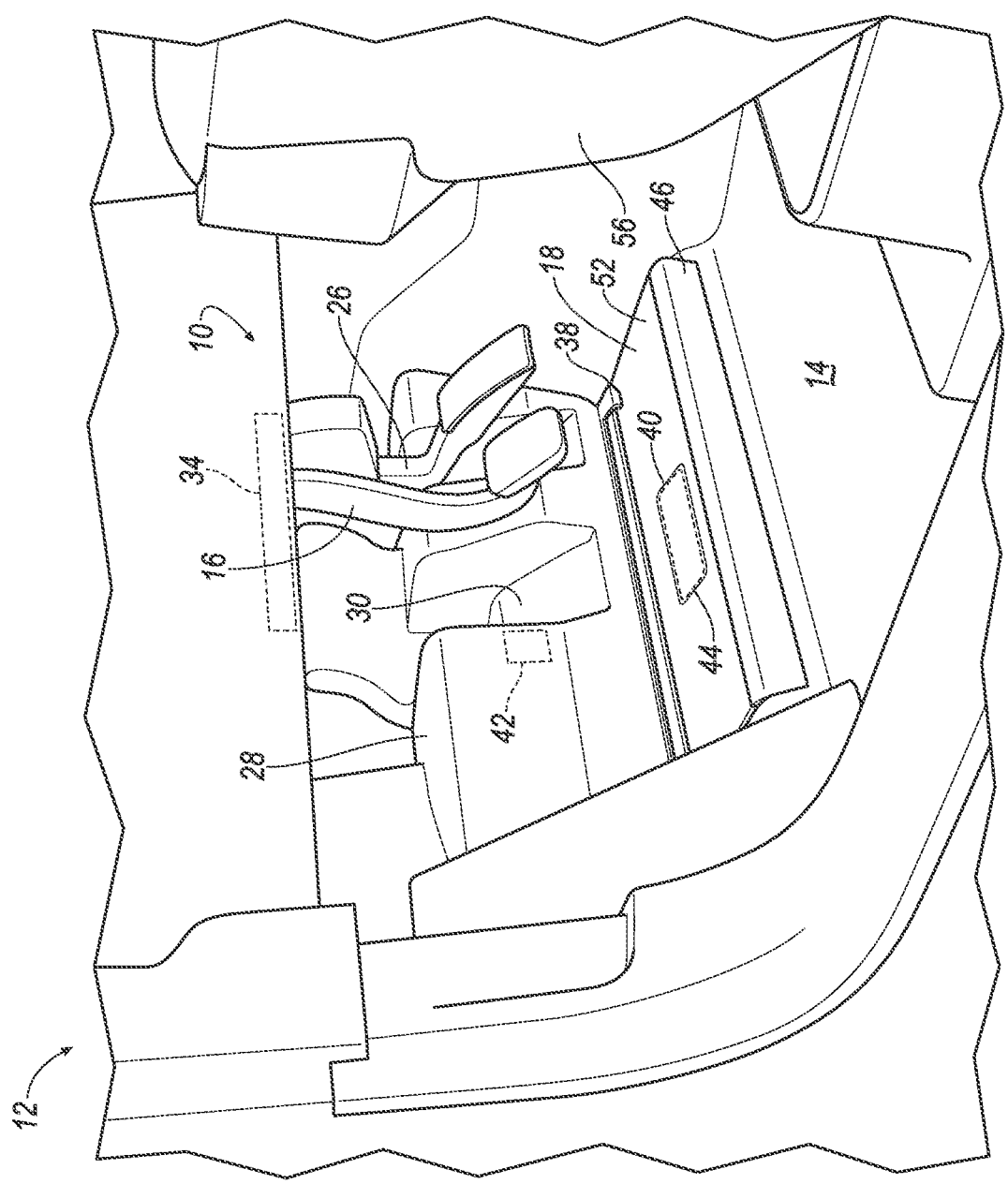
FIG. 2 is a perspective view of the vehicle pedals in a deployed position and the cover in an open position.

The assembly 10 includes a seat 56, as shown in FIGS. 1-2. The seat 56 supports the vehicle occupant when the vehicle occupant is in the vehicle cabin of the vehicle 12. The seat 56 is supported by the floor 14. The seat 56 may be movable relative to the floor 14, e.g., rotatable about a vertical axis, translatable in vehicle-forward and vehicle-rearward directions, etc.

The assembly 10, 10' includes the vehicle pedal 16, as shown in FIGS. 1-4. The vehicle pedal 16 is disposed above the floor 14, i.e., disposed in vertical direction relative to the floor 14. The vehicle pedal 16 is one of a brake pedal or an accelerator pedal. The occupant provides manual input to the vehicle pedal 16, e.g., by depressing the pedal, to actuate one or more vehicle components. For example, when the vehicle pedal 16 is a brake pedal, the occupant may depress the vehicle pedal 16 to actuate the brake 22 to slow the vehicle. In another example, when the vehicle pedal 16 is an accelerator pedal, the occupant may depress the pedal to actuate the propulsion 20 to accelerate the vehicle 12. The assembly 10, 10' may include a second vehicle pedal 26. The second vehicle pedal 26 may be the other of the brake pedal and the accelerator pedal. For example, the vehicle pedal 16 may be the brake pedal that applies the brake 22 and the second vehicle pedal 26 may be the accelerator pedal that actuates the propulsion. Collectively, the vehicle pedal 16 and the second vehicle pedal 26 are referred to herein as "vehicle pedals" 16, 26.

The assembly 10 may include a pedal housing 28, as shown in FIGS. 1-2. The pedal housing 28 receives the vehicle pedals 16, 26. The pedal housing 28 may define a cavity 30. The vehicle pedal 16 may be disposed in the cavity 30. That is, the vehicle pedal 26 may be rotatable from a stowed position to a deployed position. In the stowed position, the vehicle pedal 16 may be disposed in the cavity 30. In the deployed position, the vehicle pedal 16 may be positioned away from the pedal housing 28 and out of the cavity 30. In the stowed position, the vehicle pedal 16 may be positioned such that the occupant may not reach the vehicle pedal 16 to manually actuate one or more components. In the deployed position, the occupant may provide manual input to the vehicle pedal 16, as described above. When the vehicle 12 operates in the autonomous mode, the vehicle pedal 16 may be in the stowed position, and the occupant would not provide manual input to the vehicle pedal 16. In the stowed position, manual input to the vehicle pedal 16 from the occupant may not be transmitted to a corresponding component, i.e., each of vehicle propulsion, braking, and steering are controlled by the computer without input from the occupant. When the vehicle 12 operates in the semi-autonomous mode or the manual mode, the vehicle pedal 16 may be in the deployed position to receive manual input from the occupant. The pedal housing 28 may define a second cavity 30. The second vehicle pedal 26 may be rotatable from a stowed position to a deployed position. In the stowed position, the second vehicle pedal 26 may be disposed in the second cavity 32. In the deployed position, the second vehicle pedal 26 may be positioned away from the pedal housing 28 and out of the second cavity 32, and the occupant may depress the second vehicle pedal 26 to actuate one or more vehicle components.

Figure 4:
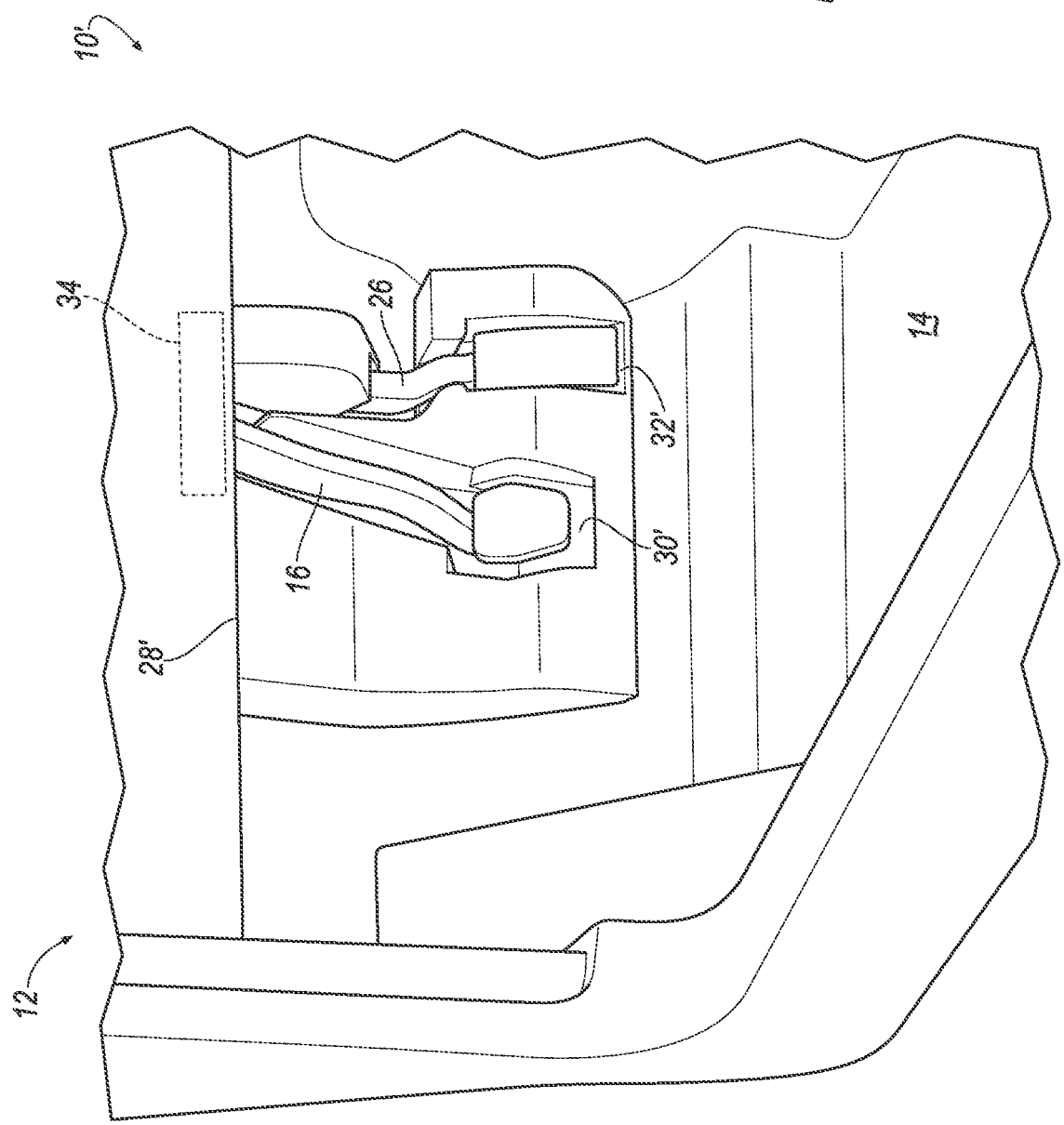
FIG. 4 is a perspective view of the front of the passenger cabin including a pedal housing.

FIG. 4 illustrates another embodiment of the 1 assembly 10' that includes a pedal housing 28'. The pedal housing 28' may include a cavity 30' and a second cavity 32'. The cavity 28' may be shaped to receive the vehicle pedal 16. That is, the cavity 30' may be designed according to the specific shape of the vehicle pedal 16 such that when the vehicle pedal 16 is in the stowed position, the pedal housing 28' and the vehicle pedal 16 form a substantially flat surface. For example, if the vehicle pedal 16 is substantially rectangular, the cavity 30' may be shaped substantially as a rectangle. In another example, if the vehicle pedal 16 is substantially hexagonal, the cavity 30' may be substantially hexagonal. The cavity 30' and the second cavity 32' may each be shaped to provide a specified clearance for the respective vehicle pedal 16, 26 received by the cavity 30' and the second cavity 32'. For example, the cavity 30' and the second cavity 32' may be shaped to provide a predetermined gap around the vehicle pedal 16 and the second vehicle pedal 26 to the pedal housing, e.g., 25 millimeters. By designing the cavity 30' according to the shape of the vehicle pedal 16, the vehicle pedal 16 may be out of view of the occupant in the stowed position and the occupant may avoid providing manual input when the vehicle 12 is in the autonomous mode. Because the assembly 10' lacks the cover 18, the shape of the cavity 30' and the second cavity 32' may obscure the vehicle pedal 16 and the second vehicle pedal 26 from view by the occupant. Alternatively, as shown in FIGS. 1-2, the cavity 30 and the second cavity 32 may be shaped irrespective of the respective shapes of the vehicle pedals 16, 26.

The assembly 10, 10' may include a motor 34, as shown in FIGS. 1-5. The motor 34 may be rotatably connected to the vehicle pedal 16. The motor 34 may rotate the vehicle pedal 16 from the stowed position to the deployed position. That is, the motor 34 may be arranged such that a shaft 36 of the motor is mounted to the vehicle pedal, and when the shaft 36 rotates, the vehicle pedal 16 rotates with the shaft 36 from the stowed position to the deployed position. When the vehicle 12 transitions from the autonomous mode to the semi-autonomous mode or the manual mode, the motor 34 may rotate the vehicle pedal 16 to the deployed position. The motor 34 may rotate both the vehicle pedal 16 and the second vehicle pedal 26 from their respective stowed positions to their respective deployed positions. For example, the shaft 36 of the motor 34 may extend through both the vehicle pedal 16 and the second vehicle pedal 26 such that when the shaft 36 rotates, both the vehicle pedal 16 and the second vehicle pedal 26 rotate. Alternatively, not shown in the Figures, the assembly 10 may include a second motor that rotates the second vehicle pedal 26 from the stowed position to the deployed position independently from the vehicle pedal 16. The motor 34 may be a suitable type, e.g., a DC brushless motor, an AC brushless motor, a DC brushed motor, etc.

Figure 3:
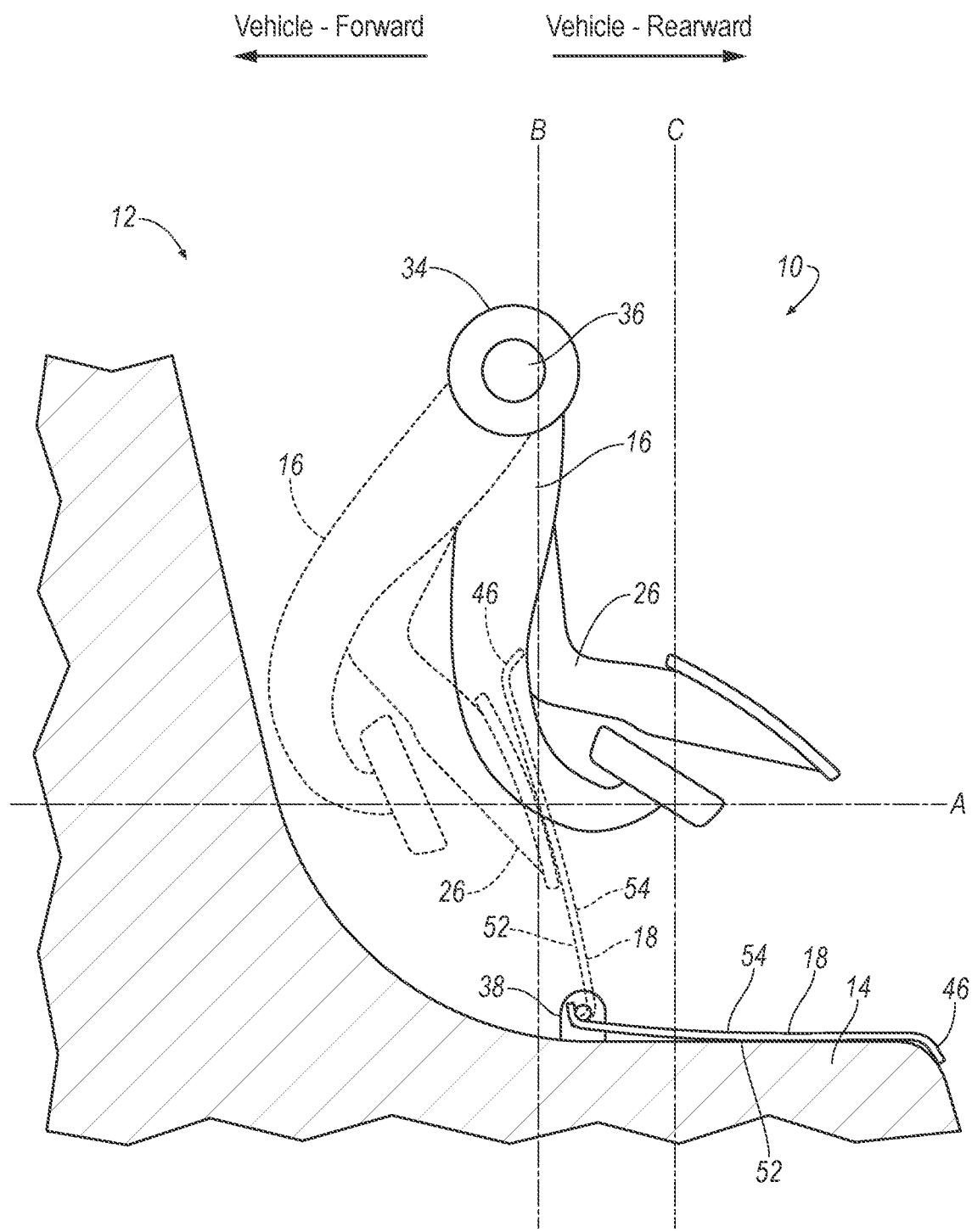
FIG. 3 is a side view of the vehicle pedal and the cover.

The assembly 10 includes the cover 18, as shown in FIGS. 1-3. The cover 18 is rotatably connected to the floor 14 and rotatable relative to the floor 14. The cover 18 hides the vehicle pedals 16, 26 from interaction by the vehicle occupant, as shown in FIGS. 1, 3. That is, the cover 18 may block the vehicle pedals 16, 26 from view when the vehicle 12 is in the autonomous mode to prevent manual input to the vehicle pedals 16, 26 by the occupant. The cover 18 may be substantially planar, i.e., flat. The cover 18 may be constructed of any suitable material, e.g., sheet metal, a polymer such as vinyl, polyvinyl chloride (PVC), etc. That is, the cover 18 may be an opaque polymer sheet that hides the vehicle pedals 16, 26 from view of the occupant. The cover 18 may be a suitable shape, e.g., rectangular, to block the vehicle pedals 16, 26 from view of the occupant.

The cover 18 has a front surface 52 and a rear surface 54, as shown in FIGS. 1-3. The "front" surface 52 faces in the vehicle-forward direction in the closed position toward the vehicle pedals 16, 26. The "rear" surface 54 faces in the vehicle-rearward direction in the closed position toward the occupant and the seat 56. The rear surface 54 may conceal the vehicle pedals 16, 26 from view by the occupant, i.e., the occupant may view the rear surface 54 when looking in toward the vehicle pedals 16, 26. The vehicle pedals 16, 26 push on the front surface 52 to move the cover 18 from the closed position to the open position.

The cover 18 is rotatable from a closed position to an open position. In the closed position, the vehicle pedals 16, 26 are behind the cover 18. That is, the vehicle pedals 16, 26 are vehicle-forward of the cover 18 and a horizontal plane A intersects the cover 18 and the vehicle pedals 16, 26. Because the vehicle pedals 16, 26 are vehicle-forward of the cover 18, the cover 18 conceals the vehicle pedals 16, 26 from access by the occupant. In the closed position, the cover 18 may be above the vehicle pedals 16, 26, as shown in FIGS. 1 and 3. That is, at least a portion of the cover 18 extends above a portion of at least one of the vehicle pedals 16, 26, preventing access to the vehicle pedals 16, 26 by the occupant. A vertical plane B intersects at least one of the vehicle pedals 16, 26 and the cover 18 when the cover 18 is above the vehicle pedals 16, 26. In FIG. 3, the vertical plane B intersects the cover 18 and the second vehicle pedal 26, and the vehicle pedals 16, 26 may be arranged so that the cover 18 may be above the vehicle pedal 16. In the closed position, the rear surface 54 of the cover 18 faces the vehicle pedals 16, 26 and the front surface 52 of the cover 18 faces the seat 56.

In the open position, the vehicle pedals 16, 26 are disposed above the cover 18, as shown in FIGS. 2-3. That is, the cover 18 extends along the floor 14 and the vehicle pedals 16, 26 rotate above the cover 18 and a vertical plane C intersects the vehicle pedals 16, 26 and the cover 18. In the open position, the front surface 52 of the cover 18 is below the vehicle pedals 16, 26 and the rear surface 54 of the cover 18 contacts the floor 14. When the cover 18 extends along the floor 14 and the vehicle pedals 16, 26 are disposed above the cover 18, the occupant may provide manual input to the vehicle pedals 16, 26 unobstructed by the cover 18. The open position is vehicle-rearward of the closed position. That is, the cover 18 is rotatable in a vehicle-rearward direction from the closed position to the open position. By rotating in the vehicle-rearward direction, the cover 18 rotates toward the occupant. The occupant may move the cover 18 from the open position to the closed position, e.g., upon providing input to operate the vehicle 12 in the autonomous mode.

The vehicle pedal 16 and/or the vehicle pedal 26 may move the cover 18 from the closed position to the open position, as shown in FIG. 3. When the motor 34 rotates the vehicle pedals 16, 26 to the deployed position, the vehicle pedals 16, 26 may contact the front surface 52 of the cover 18, pushing the cover 18 in the vehicle-rearward direction. In FIG. 3, the vehicle pedal 26 pushes the cover 18, and the vehicle pedals 16, 26 may be arranged such that either or both of the vehicle pedals 16, 26 may push the cover 18. When the vehicle pedals 16, 26 rotate to the deployed position, the cover 18 rotates to the open position. Thus, the motor 34 can move the cover 18 to the open position by rotating the vehicle pedals 16, 26.

The assembly 10 may include a hinge 38 between the cover 18 and the floor 14, as shown in FIGS. 1-3. The hinge 38 may directly connect the cover 18 to the floor 14, i.e., with the lack of other components between hinge 38 and the cover 18 and between the hinge 38 and the floor 14. The hinge 38 is supported on the floor 14. For example, the hinge 38 may be disposed in the floor 14. The hinge 38 may be rotatably connected to the cover 18. The cover 18 may rotate about the hinge 38 from the closed position to the open position. When the vehicle pedal 16 pushes on the cover 18, the cover 18 may rotate about the hinge 38. The hinge 38 allows the cover 18 to rotate relative to the floor 14.

The cover 18 may include a magnet 40, as shown in FIGS. 1-2. The magnet 40 may secure the cover to the pedal housing 28 and to the floor 14. The magnet 40 may be substantially flush with the front surface 52 and the rear surface 54. Alternatively, the magnet 40 may be disposed between the front surface 52 and the rear surface 54, i.e., the magnet may be disposed within the cover 18 such that the rear surface 54 conceals the magnet 40 from view by the occupant. The pedal housing 28 may include a second magnet 42. When the cover 18 is in the closed position, the magnet 40 and the second magnet 42 may magnetically attract, magnetically securing the cover 18 against the pedal housing 28 in the closed position. The floor 14 may include a third magnet 44. The magnet 40 and the third magnet 44 may magnetically attract, magnetically securing the cover 18 against the floor 14 in the open position. Alternatively, not shown in the Figures, the cover 18 may include a ferromagnetic portion (e.g., a rectangular portion made of a ferromagnetic material) that is magnetically attracted to the second magnet 42 in the pedal housing 28 and the third magnet 44 in the floor 14. Yet alternatively, not shown in the Figures, the cover 18 may include the magnet 40, the pedal housing 28 may include a ferromagnetic portion, and the floor 14 may include a ferromagnetic portion, and the magnet 40 may secure the cover 18 to the ferromagnetic portions of the pedal housing 28 and the floor 14. By using the magnet 40, the second magnet 42, and the third magnet 44, the cover 18 remains secured to the pedal housing 28 or the floor 14 and resists disengaging from the pedal housing 28 or the floor 14 from external forces, e.g., vibrations from a road.

The cover 18 may include a lip 46, as shown in FIGS. 1-3. The lip 46 extends along the cover 18. When the cover 18 is in the open position, the lip 46 may be substantially flush with the floor 14. That is, the floor 14 may have a contour, and the cover 18 may be shaped to follow the contour. For example, the lip 46 may be curved to substantially align with the contour. When the lip 46 is substantially flush with the floor 14, the cover 18 may avoid contact with the occupant's feet, preventing the occupant from inadvertently moving the cover 18 from the open position. The lip 46 may be a suitable material, e.g., rubber, plastic, etc. The cover 18 may provide a footrest for the occupant, and the cover 18 may be a substantially rigid material to support the occupant's feet. For example, when the cover 18 is in the open position, the cover 18 may provide support for the occupant's feet on the portion of the floor 14 that the cover 18 occupies. In another example, the cover 18 may block the occupant's feet from the vehicle pedals 16, 26 in the closed position, preventing the occupant from operating the vehicle pedals 16, 26.

The vehicle 12 may include an autonomous driving controller 48. The autonomous driving controller 48 may be one or more computers, each computer including a processor and a memory. For example, the autonomous driving controller 48 may be an electronic control unit (ECU) that communicates with vehicle components to operate the vehicle 12 in the autonomous mode. The autonomous driving controller 48 is programmed to operate the vehicle 12 in an autonomous mode. That is, the autonomous driving controller 48 is programmed to operate the propulsion 20, the brake 22, and the steering motor 24 without input from the occupant. The autonomous driving controller 48 communicates with the propulsion 20, the brake 22, and the steering motor 24 over a communications bus 50 such as a CAN bus, LIN bus etc., and or other wired and/or wireless technologies, e.g., Ethernet, WIFI, etc.

The autonomous driving controller 48 may be programmed to actuate the motor 34 to move the vehicle pedal 16 upon receiving input to transition from the autonomous mode to the semiautonomous mode or the manual mode. That is, when the occupant provides input to operate the vehicle 12 in the semiautonomous mode or the manual mode, the autonomous driving controller 48 may move the vehicle pedal 16 to move the cover 18 to the open position, allowing the occupant to provide manual input to the vehicle pedal 16. When the occupant provides input to operate the vehicle 12 in the autonomous mode, the autonomous driving controller 48 may actuate the motor 34 to move the vehicle pedal 16 into the pedal housing 28, moving the vehicle pedal 16 away from the occupant to prevent manual input to the vehicle pedal 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a floor;
   a vehicle pedal disposed above the floor;
   a motor disposed above the floor and rotatably connected to the vehicle pedal;
   a cover rotatably connected to the floor below the motor and rotatable relative to the floor from a closed position in which the vehicle pedal is vehicle-forward of the cover to an open position in which the vehicle pedal is disposed vertically above the cover; and
   a pedal housing, wherein the cover includes a first magnet and the pedal housing includes a second magnet, the first and second magnets magnetically securing the cover to the pedal housing in the closed position.

2. The assembly of claim 1, wherein the pedal housing defines a cavity and the vehicle pedal is disposed in the cavity when the cover is in the closed position.

3. The assembly of claim 2, further comprising a second vehicle pedal, wherein the pedal housing defines a second cavity and the second vehicle pedal is disposed in the second cavity when the cover is in the closed position.

4. The assembly of claim 1, wherein the motor is arranged to rotate the vehicle pedal to a deployed position.

5. The assembly of claim 4, wherein when the vehicle pedal is in the deployed position, the cover is in the open position.

6. The assembly of claim 1, wherein the vehicle pedal is arranged to move the cover from the closed position to the open position.

7. The assembly of claim 1, wherein the floor includes a third magnet, the first and third magnets magnetically securing the cover to the floor in the open position.

8. The assembly of claim 1, wherein the open position is vehicle-rearward of the closed position.

9. The assembly of claim 1, wherein the cover includes a lip that is substantially flush with the floor when the cover is in the open position.

10. The assembly of claim 1, further comprising a second vehicle pedal, wherein the vehicle pedal and the second vehicle pedal are behind the cover in the closed position.

11. The assembly of claim 1, wherein the cover is rotatable in a vehicle-rearward direction from the closed position to the open position.

12. The assembly of claim 1, further comprising a hinge between the cover and the floor, wherein the cover rotates about the hinge from the closed position to the open position.

13. The assembly of claim 1, wherein the vehicle pedal is one of a brake pedal or an accelerator pedal.

14. The assembly of claim 1, further comprising a seat, wherein the cover has a front surface facing the vehicle pedal in the closed position in a vehicle-forward direction and a rear surface facing the seat in the closed position in a vehicle-rearward direction.

15. The assembly of claim 1, wherein the cover is disposed vertically above the vehicle pedal in the closed position.

16. The assembly of claim 1, wherein the vehicle pedal is rotatable by the motor to push the cover to the open position.

17. The assembly of claim 1, wherein the cover is movable by the pedal to the open position.

18. An assembly, comprising:
    a floor;
    a vehicle pedal disposed above the floor;
    a motor disposed above the floor and rotatably connected to the vehicle pedal; and
    a cover rotatably connected to the floor below the motor and rotatable relative to the floor from a closed position in which the vehicle pedal is vehicle-forward of the cover to an open position in which the vehicle pedal is disposed vertically above the cover;
    wherein the cover includes a first magnet and the floor includes a second magnet, the first and second magnets magnetically securing the cover to the floor in the open position.

* * * * *